UNITED STATES PATENT OFFICE 2,940,896
Patented June 14, 1960

2,940,896

QUATERNARY AMMONIUM AND PHOSPHORAMIDE ESTER ATTRACTANTS AND INSECT CONTROL THEREWITH

Oliver S. Sproat, Jr., North Hills, Pa., assignor to Pennsalt Chemicals Corporation, a corporation of Pennsylvania No Drawing. Filed Feb. 23, 1956, Ser. No. 567,086

28 Claims. (Cl. 167—48)

The present invention relates to the control of insects and to compositions therefor; and, more particularly, the present invention relates to a method of controlling and eradicating roaches and to novel compositions that may be used therefor.

The use of substances to attract or lure insects into a situation where they can be exterminated, as by exposure to an insecticide, a trap, or the like, has been suggested in the past. Substances for attracting roaches have received some prior attention by workers in the entomological field, but the effectiveness of the substances has been open to question. Actually, tests with these prior substances in accordance with procedures set forth hereinafter have shown that they have no effect, particularly when the roach may be in a normally favorable environment with access to food, water, and the society of other like insects.

It is the principal object of the present invention to provide a novel method for controlling and exterminating insects.

It is another object of the present invention to provide a novel method for controlling and exterminating roaches.

Still another object of the present invention is to provide a method which will attract roaches to a situation where they can be exterminated even though the roaches may be in a normally favorable environment and therefore not normally susceptible to attraction or luring by prior suggested attractants.

A further object of the present invention is to provide a novel composition of matter, comprising an insecticide, which will attract insects, particularly roaches, thereto for their extermination even though the roaches are in an environment with access to food, water, and the like.

Other objects will become apparent from a consideration of the following specification and the claims.

The method of the present invention comprises, in the control of roaches and other insects, placing, at a site available to roaches and conducive to their extermination, an attractant comprising a high molecular weight cationic surface-active agent. The novel composition of the present invention will comprise an insecticide, especially an insecticide specific to roaches, and a high molecular weight cationic surface-active agent.

Of the high molecular weight cationic surface-active agents, the quaternary ammonium salts having a molecular weight above about 250 have been found to be particularly suitable. Examples of such compounds are the alkyl dimethylbenzyl ammonium halides, the 3-p-tert-alkylphenoxy-2-hydroxyalkyl-trialkyl ammonium halides, like 3-p-tert-octylphenoxy-2-hydroxypropyl-triethyl ammonium chloride, the reaction product of ethylene chlorobromide and sodium didecyldithiocarbamate, which may be best referred to as N,N-didecyl-2-thionothiazolidonium bromide, the salts of long chain amines derived from fatty acids, such as the acetates having the formula:

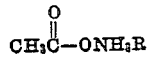

where R is an alkyl group containing from 8 to 18 carbon atoms, exemplified by the acetate salts of amines derived from coconut fatty acids, the alkyl alkylbenzyl-N,N,N',N'-tetraalkyl thiuronium halides, like dodecyl methylbenzyl-N,N,N',N'-tetramethylthiuronium chloride, and the like.

Another group of high molecular weight cationic surface-active agents found to be particularly outstanding are the phosphoramide salts or esters or phosphoramide ester salts possessing the generic structural formula:

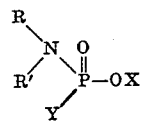

where X is a long chain alkyl group or a long chain alkyl-substituted ammonium group; where R is hydrogen or an alkyl group; where R' is an alkyl group, and where Y is

R and R' being as defined above, or R"O— in which R" is an alkyl group. Referring to the alkyl groups mentioned above, except for those in X, they may contain from 1 to about 18 carbon atoms, such as methyl, ethyl, etc., up to stearyl. Preferably, however, all of the alkyl groups in R, R' and Y, except one, are short, that is, contain from 1 to about 3 carbon atoms, and the remaining alkyl group will be a long chain, that is, contain about 8 to about 18 carbon atoms. As stated, the alkyl group in X will be a long chain, and by long chain alkyl group is meant herein an alkyl group containing from about 8 to about 18 carbon atoms. Particularly advantageous compounds in this group are the phosphoramide ester salts represented by the formula:

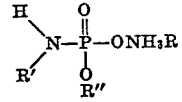

where R and R' are long chain alkyl groups, especially alkyl groups containing about 10 to 14 carbon atoms, and where R" is an alkyl group containing 1 to 2 carbon atoms; and the phosphoramide esters represented by the formula:

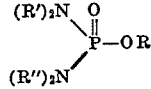

where R is a long chain alkyl group, especially one containing about 8 to 12 carbon atoms, and where R' and R" are alkyl groups containing 1 to 2 carbon atoms.

The phosphoramide salts and the phosphoramide esters can be made in the manner taught by Woodstock, U.S. Patent 2,406,423, granted August 27, 1946, or by other methods well understood by those skilled in the art.

It has been found that a compound of the type set forth above will lure roaches to its site even when they are in a normally comfortable environment, that is well fed, well watered, as safe as accustomed and in the company of other roaches. It is not possible at the present time to explain why these particular materials work, and it is not believed to be a question of volatility or vapor pressure of the compound or of its odor. At any rate, such compounds may be used as an attractant or lure to stimulate the attention of roaches and to attract them to the site of the compound and thus to a situation where their extermination can be facilitated. Thus the compounds can be used in conjunction with an insecticide, such as in admixture with the attractant compound or in the vicinity of the attractant compound or applied to the roaches once they have been attracted to the site of the attractant compound. Likewise, the attractant compound can be used in conjunction with a trap in which the roaches, once they have entered, may be retained and then disposed of as desired.

Reference has been made above to the use of insecticides with the attractant compounds, and insecticides, including those specific to roaches, are well known. Examples of such insecticides are dichloro-diphenyl-trichloroethane (DDT), octachloro - 4,7 - methano-tetrahydroindane (chlordane), cryolite, pyrethrum, sodium fluoride, sodium fluosilicate, O,O-diethyl-O-paranitrophenyl thiophosphate (parathion), O,O-dimethyl dithiophosphate of diethyl mercaptosuccinate (malathion), and the like. Combinations of insecticides may also be employed, a particularly suitable combination being DDT and chlordane. From the foregoing it will be seen that the insecticide employed may be either a contact type or stomach poison type, or a combination of contact and stomach poison type.

A highly advantageous form in which the attractant compounds of the present invention may be employed is in admixture with an insecticide in an insecticidal composition. As is well known, in insecticidal compositions the insecticide itself may make up only a small portion thereof, the remainder being an appropriate vehicle. Hence, such composition, in accordance with the present invention, will comprise an attractant of the type described, an insecticide, especially a roachcide, and a suitable vehicle. The exact vehicle selected will depend upon the desired form of the composition, and there is a wide variety of materials available for use as pesticidal adjuvants. When the composition is in liquid form, a solvent for the attractant and insecticide will be employed. The solvents most usually employed in liquid insecticidal compositions are the liquid aliphatic hydrocarbons, especially kerosene, and such materials may be employed in the present compositions. Other materials may be included in such solutions such as auxiliary solvents like methylated naphthalenes to prevent crystallization of DDT at low temperatures. The composition may also be in powder form, and in such case the usual inert powdered vehicle materials, such as clays, talc, pyrophyllite, and the like, may be employed. The composition of the present invention may also be prepared in the form of shaped solid bodies, such as pellets, tapes, "chalk" sticks, and the like. In these cases the composition comprising the attractant, insecticide and vehicle may also comprise a binder to render the mix cohesive and formable. Because the present compositions function by attracting roaches to a fixed site, the compositions are of the type adapted to application to a localized area, as by spraying to a definite area, pouring, impregnating, depositing, placing, "chalking," and the like, as distinguished, for example, from aerosol application where the active ingredient is dispersed as a fog to saturate a volume of air.

In the compositions of the present invention the concentration of attractant and insecticide may vary somewhat. It has been found that as little as about .005%, by weight, of the attractant is suitable, especially in solid compositions, and for most purposes there is no significant advantage in employing more than about 1% of the attractant. In liquid compositions, it is preferred that the attractant be present in an amount of at least about 0.01%. The insecticide will generally be present in an amount of at least about 1%, by weight, and amounts thereof as high as about 10% may be employed.

The following examples illustrate the attractancy effect of the compounds employed in accordance with the present invention and the preparation and efficacy of the attractant- and insecticide-containing compositions of the invention, and are not intended to limit the scope of the invention in any way.

EXAMPLES I-XIX

Roaches are reared in containers consisting of glass jars about 7 inches in diameter and about 8 inches in height (volume about 308 cubic inches or 5,050 cubic centimeters). The roaches in the containers are supplied with the usual food for these containers in which the roaches are reared, namely crushed dog biscuits. Drinking water is held in a tube plugged with absorbent cotton. The containers are covered with muslin. The atmospheric conditions under which the roaches are raised are 80° F. and 80% relative humidity. Two days before the tests commence roaches are taken from these containers and ten roaches (five male and five female) are placed in each of several identical containers under the same conditions in which they have been reared. The conditions througout the period and during the test are the same as those in which the roaches were reared.

Solutions of chemical substances, set forth in the tables below, are prepared by dissolving the compound in an appropriate solvent (acetone or ethyl alcohol) in the desired concentration and by applying the solution to a small wad of absorbent cotton. The treated cotton is then allowed to dry. The dried cotton is then pushed into one end of a small cage made by rolling a piece of screening into a cylinder about one inch in diameter and two inches long. This cage permits the roaches to approach but not contact the chemically impregnated cotton. The cage containing the impregnated cotton is lowered into each test container and placed in an upright position, with the cotton-containing end uppermost.

The number of visits paid to the treated cotton-containing cage by the roaches is observed. A visit is defined as a definite exhibition of interest in which the roach climbs upon and inspects the cage, attempts to reach the treated cotton and takes positive action in response to the stimulus provided. In each series of tests, a cage containing no treated cotton is placed in one of the containers to determine whether an unusual object, namely the cage itself, might arouse any curiosity in the roaches. It is found that the cage alone provides no real center of attraction.

The substances examined as attractants are enumerated in the accompanying Table I which also shows the quantity of the compound on the absorbent cotton and the visits paid to the cages by roaches in response to the respective concentration of chemicals.

Table I

| | Stimulus Source | Quantity of Compound on Cotton, g./swab | Visits of Roaches to Stimulus Source | | |
|---|---|---|---|---|---|
| | | | 1st Hr. | Next Half Hr. | Total |
| Series A: | | | | | |
| I | 3-p-tert-octylphenoxy-2 - hydroxypropyl-triethylammonium chloride. | .0001 | 6 | 1 | 7 |
| II | Same as I | .0002 | 3 | 0 | 3 |
| III | Reaction product of ethylene chlorobromide and sodium didecyldithiocarbamate. | .0001 | 1 | 1 | 2 |
| IV | Same as III | .0002 | 9 | 0 | 9 |
| V | Cage only | | 0 | 0 | 0 |
| Series B: | | | | | |
| VI | Reaction product of ethylene chlorobromide and sodium didecyldithiocarbamate. | .0001 | 4 | 3 | 7 |
| VII | Same as VI | .0002 | 12 | 3 | 15 |
| VIII | Dodecylmethylbenzyl-N,N,N',N' - tetramethylthiuronium chloride. | .0001 | 22 | 1 | 23 |
| IX | Same as VIII | .0002 | 22 | 1 | 23 |
| X | Cage only | | 2 | 2 | |

Table I—Continued

| Stimulus Source | | Quantity of Compound on Cotton, g./swab | Visits of Roaches to Stimulus Source | | |
|---|---|---|---|---|---|
| | | | 1st Hr. | Next Half Hr. | Total |
| Series C: | | | | | |
| XI | Dodecylmethylbenzyl-N,N,N',N' - tetramethylthiuronium chloride. | .0001 | 10 | 2 | 12 |
| XII | Same as XI | .0002 | 27 | 3 | 30 |
| XIII | Cage only | | 2 | 0 | 2 |
| Series D: | | | | | |
| XIV | n-Octyl bis(dimethylamido)-phosphate. | .0001 | 6 | 5 | 11 |
| XV | Cage only | | 2 | 0 | 2 |
| Series E: | | | | | |
| XVI | Acetate of coconut fatty acid amine (the alkyl groups containing from 8 to 18 carbon atoms, about 45-50% being dodecyl). | .0001 | 27 | 3 | 30 |
| XVII | Same as XVI | .0002 | 7 | 1 | 8 |
| XVIII | Same as XVI | .0005 | 32 | 3 | 35 |
| XIX | Same as XVI | .0010 | 18 | 5 | 23 |

EXAMPLES XX-XXIII

In these examples four series of tests (XX-XXIII) are set forth. In each series a box six feet long, four feet wide and one foot high, with a screened top, is employed. Each series is made up of three separate tests. In each test an open-wide-mouthed quart jar containing ten roaches (five male and five female) and food and water is placed on its side at one end of the box, and an insecticide composition is placed at the other end of the box. The roaches are then in this environment for approximately 24 hours. The roaches are then removed from the box and observed every day for a week. The total number of dead roaches at each day is noted.

In series XX, the insecticide material is prepared by wetting a cotton wad with 5 cc. of a solution of DDT and chlordane in a solvent consisting principally of kerosene (4% DDT, 2% chlordane, balance solvent), and permitting the treated cotton to stand in the air for a day.

In series XXI, the insecticide material was prepared as in series XX, with the additional step of adding to the cotton 5 cc. of a solution of 0.001 g./cc. of dodecylammonium-O-methyl-N-dodecyl phosphoramide in acetone.

In series XXII, the insecticide site is prepared by adding 5 cc. of a 0.01 g./cc. of DDT in acetone and 5 cc. of a 0.01 g./cc. of chlordane in acetone to a glass petri dish, and permitting the dish to air dry for a day.

In series XXIII, the site is prepared as in series XXII with the additional step of adding to the petri dish, 10 cc. of a 0.001 g./cc. solution of dodecylammonium-O-methyl-N-dodecyl phosphoramide in acetone, and permitting the combined solutions to dry for a day.

The results are tabulated as follows:

Table II

| Series | Jar No. | Total No. of Dead Roaches After Each Day | | | | | | | Total Dead For Series |
|---|---|---|---|---|---|---|---|---|---|
| | | 1 | 2 | 3 | 4 | 5 | 6 | 7 | |
| XX | 1 | 0 | 0 | 1 | 1 | 1 | 1 | 1 | |
| | 2 | 0 | 0 | 0 | 0 | 0 | 0 | 0 | |
| | 3 | 0 | 0 | 0 | 0 | 3 | 4 | 5 | 6 |
| XXI | 1 | 0 | 0 | 0 | 0 | 1 | 1 | 1 | |
| | 2 | 0 | 0 | 0 | 2 | 2 | 2 | 2 | |
| | 3 | 0 | 0 | 3 | 5 | 5 | 5 | 8 | 11 |
| XXII | 1 | 0 | 0 | 0 | 0 | 0 | 0 | 0 | |
| | 2 | 0 | 0 | 0 | 0 | 0 | 0 | 0 | |
| | 3 | 0 | 0 | 0 | 0 | 4 | 4 | 4 | 4 |
| XXIII | 1 | 0 | 0 | 2 | 2 | 2 | 2 | 3 | |
| | 2 | 0 | 0 | 0 | 0 | 0 | 0 | 0 | |
| | 3 | 0 | 0 | 0 | 0 | 2 | 2 | 4 | 7 |

Considerable modification is possible in the selection of the particular techniques followed in carrying out the present method as well as in the selection of the particular materials employed, without departing from the scope of the invention.

I claim:

1. In the control of roaches and like insects the improvement which comprises placing at a site available to the insects and conducive to their extermination, an attractant selected from the group consisting of 3-p-alkylphenoxy-2-hydroxyalkyltrialkyl ammonium bromides and chlorides in which the alkyl groups contain about 2 to 10 carbon atoms, N,N-dialkyl-2-thionothiazolidonium bromides and chlorides in which the alkyl groups contain about 8 to 12 carbon atoms, alkyl alkylbenzyl-N,N,N',N'-tetraalkylthiuronium chlorides and bromides in which the alkyl groups contain from 1 to about 12 carbon atoms, fatty amine acetates in which the alkyl group contains about 8 to 18 carbon atoms, phosphoramide ester salts represented by the formula

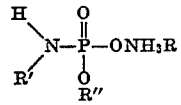

wherein R and R' are alkyl groups containing about 10 to 14 carbon atoms and where R'' is an alkyl group containing from 1 to about 2 carbon atoms and phosphoramide esters represented by the formula

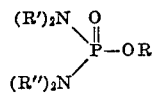

where R is an alkyl group containing about 8 to 12 carbon atoms and where R' and R'' are alkyl groups containing from 1 to about 2 carbon atoms.

2. The method of claim 1 wherein said attractant comprises N,N-didecyl-2-thionothiazolidonium bromide.

3. The method of claim 1 wherein said attractant comprises a fatty amine acetate in which the alkyl group contains about 8 to 18 carbon atoms.

4. The method of claim 1 wherein said attractant is a member selected from the group consisting of alkyl alkylbenzyl-N,N,N',N'-tetraalkylthiuronium bromides and chlorides in which the alkyl groups contain from 1 to about 12 carbon atoms.

5. The method of claim 4 wherein said attractant comprises dodecyl methylbenzyl-N,N,N',N'-tetramethylthiuronium chloride.

6. The method of claim 1 wherein said attractant comprises a phosphoramide ester salt possessing the formula:

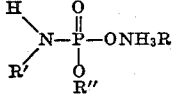

wherein R and R' are alkyl groups of about 10 to 14 carbon atoms, and where R'' is an alkyl group containing 1 to 2 carbon atoms.

7. The method of claim 6 wherein said phosphoramide ester salt comprises dodecylammonium-O-methyl-N-dodecyl phosphoramide.

8. A composition for the control of roaches and like insects comprising a solution of an insecticide and an attractant for the insects selected from the group consisting of 3-p-alkylphenoxy-2-hydroxyalkyltrialkyl ammonium bromides and chlorides in which the alkyl groups contain about 2 to 10 carbon atoms, N,N-dialkyl-2-thionothiazolidonium bromides and chlorides in which the alkyl groups contain about 8 to 12 carbon atoms, alkyl alkylbenzyl-N,N,N',N'-tetraalkylthiuronium chlorides and bromides in which the alkyl groups contain from 1 to about 12 carbon atoms, fatty amine acetates in which the alkyl group contains about 8 to 18 carbon atoms, phosphoramide ester salts represented by the formula

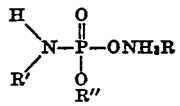

wherein R and R' are alkyl groups containing about 10 to 14 carbon atoms and where R'' is an alkyl group containing from 1 to about 2 carbon atoms and phosphoramide esters represented by the formula

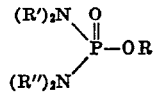

where R is an alkyl group containing about 8 to 12 carbon atoms and where R' and R'' are alkyl groups containing from 1 to about 2 carbon atoms.

9. The method of claim 1 wherein said attractant comprises a phosphoramide ester possessing the formula:

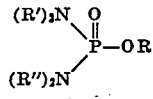

where R is a alkyl group of about 8 to 12 carbon atoms, and where R' and R'' are alkyl groups containing 1 to 2 carbon atoms.

10. The method of claim 9 wherein said phosphoramide ester comprises n-octyl bis(dimethylamido) phosphate.

11. The composition of claim 8 wherein said attractant comprises N,N-didecyl-2-thionothiazolidonium bromide.

12. The composition of claim 8 wherein said attractant comprises a fatty amine acetate in which the alkyl group contains about 8 to 18 carbon atoms.

13. The composition of claim 8 wherein said attractant comprises a phosphoramide ester salt possessing the formula:

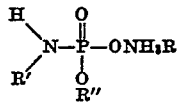

where R and R' are alkyl groups of about 10 to 14 carbon atoms, and where R'' is an alkyl group containing 1 to 2 carbon atoms.

14. The composition of claim 13 wherein said phosphoramide ester salt comprises dodecylammonium-O-methyl-N-dodecyl phosphoramide.

15. The composition of claim 8 wherein said attractant comprises a phosphoramide ester possessing the formula:

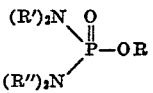

where R is a alkyl group of about 8 to 12 carbon atoms, and where R' and R'' are alkyl groups containing 1 to 2 carbon atoms.

16. The composition of claim 8 in which the attractant is the reaction product of ethylene chlorobromide and sodium didecyldithiocarbamate.

17. The composition of claim 8 in which the attractant is dodecylmethylbenzyl-N,N,N',N'-tetramethylthiuronium chloride.

18. The composition of claim 15 wherein said phosphoramide ester comprises n-octyl bis(dimethylamido) phosphate.

19. A composition for the control of roaches and like insects comprising an insecticide, an attractant for the insects selected from the group consisting of 3-p-alkylphenoxy-2-hydroxyalkyltrialkyl ammonium bromides and chlorides in which the alkyl groups contain about 2 to 10 carbon atoms, N,N-dialkyl-2-thionothiazolidonium bromides and chlorides in which the alkyl groups contain about 8 to 12 carbon atoms, alkyl alkylbenzyl-N,N,N',N'-tetraalkylthiuronium chlorides and bromides in which the alkyl groups contain from 1 to about 12 carbon atoms, fatty amine acetates in which the alkyl group contains about 8 to 18 carbon atoms, phosphoramide ester salts represented by the formula

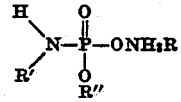

wherein R and R' are alkyl groups containing about 10 to 14 carbon atoms and where R'' is an alkyl group containing from 1 to about 2 carbon atoms and phosphoramide esters represented by the formula

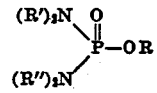

where R is an alkyl group containing about 8 to 12 carbon atoms and where R' and R'' are alkyl groups containing from 1 to about 2 carbon atoms and a solid vehicle as a carrier therefor.

20. In the control of roaches and like insects, the improvement which comprises placing at a site available to the insects and conducive to their extermination, a composition comprising an insecticide and an attractant for the insects selected from the group consisting of 3-p-alkylphenoxy-2-hydroxyalkyltrialkyl ammonium bromides and chlorides in which the alkyl groups contain about 2 to 10 carbon atoms, N,N-dialkyl-2-thionothiazolidonium bromides and chlorides in which the alkyl groups contain about 8 to 12 carbon atoms, alkyl alkylbenzyl-N,N, N',N'-tetraalkylthiuronium chlorides and bromides in which the alkyl group contain from 1 to about 12 carbon atoms, fatty amine acetates in which the alkyl group contains about 8 to 18 carbon atoms, phosphoramide ester salts represented by the formula

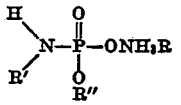

wherein R and R' are alkyl groups containing about 10 to 14 carbon atoms and where R'' is an alkyl group containing from 1 to about 2 carbon atoms and phosphoramide esters represented by the formula

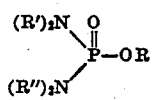

where R is an alkyl group containing about 8 to 12 carbon atoms and where R' and R'' are alkyl groups containing from 1 to about 2 carbon atoms.

21. In the control of roaches and like insects, the improvement which comprises placing at a site available to the insects and conducive to their extermination the composition of claim 20 and a vehicle as a carrier therefor.

22. The method of claim 1 wherein said attractant comprises N,N-dialkyl-2-thionothiazolidonium chlorides and bromides where the alkyl group contains about 8 to 12 carbon atoms.

23. The composition of claim 8 wherein said attractant is selected from the group consisting of N,N-dialkyl-2-thionothiazolidonium bromides and chlorides where the alkyl group contains about 8 to 12 carbon atoms.

24. The method of claim 1 wherein said attractant is selected from the group consisting of 3-p-alkylphenoxy-2-hydroxyalkyl-trialkylammonium bromides and chlorides where the alkyl groups contain about 2 to 10 carbon atoms.

25. The process of claim 24 in which the attractant is 3-p-tert-octylphenoxy-2-hydroxypropyltriethyl ammonium chloride.

26. The method of claim 20 in which the attractant is selected from the group consisting of N,N-dialkyl-2-thionothiazolidonium bromides and chlorides in which the alkyl groups contain about 8 to 12 carbon atoms.

27. The method of claim 1 wherein the attractant is cocoanut fatty acid amine acetate.

28. The composition of claim 12 wherein the attractant is cocoanut fatty acid amine acetate.

References Cited in the file of this patent

UNITED STATES PATENTS

| | | |
|---|---|---|
| 2,295,504 | Shelton | Sept. 8, 1942 |
| 2,418,652 | Maxwell | Apr. 8, 1947 |

FOREIGN PATENTS

| | | |
|---|---|---|
| 487,503 | Great Britain | June 21, 1938 |